US008566705B2

(12) United States Patent
Berkner

(10) Patent No.: US 8,566,705 B2
(45) Date of Patent: Oct. 22, 2013

(54) DYNAMIC DOCUMENT ICONS

(75) Inventor: Kathrin Berkner, Santa Clara, CA (US)

(73) Assignee: Ricoh Co., Ltd., Tokyo (JP)

(*) Notice: Subject to any disclaimer, the term of this patent is extended or adjusted under 35 U.S.C. 154(b) by 1229 days.

(21) Appl. No.: 11/019,802

(22) Filed: Dec. 21, 2004

(65) Prior Publication Data

US 2006/0136478 A1  Jun. 22, 2006

(51) Int. Cl.
*G06F 17/00* (2006.01)

(52) U.S. Cl.
USPC .......................................... 715/243; 715/200

(58) Field of Classification Search
USPC ......... 715/517, 243, 203, 252, 273, 815, 825, 715/838, 200; 707/6
See application file for complete search history.

(56) References Cited

U.S. PATENT DOCUMENTS

| | | | | |
|---|---|---|---|---|
| 5,465,327 A * | 11/1995 | Wang et al. | | 715/839 |
| 5,586,237 A * | 12/1996 | Baecker et al. | | 345/670 |
| 5,625,767 A * | 4/1997 | Bartell et al. | | 345/440 |
| 5,689,718 A * | 11/1997 | Sakurai et al. | | 715/517 |
| 5,751,287 A * | 5/1998 | Hahn et al. | | 715/775 |
| 5,765,176 A * | 6/1998 | Bloomberg | | 715/514 |
| 5,903,904 A | 5/1999 | Peairs | | |
| 5,933,823 A * | 8/1999 | Cullen et al. | | 707/6 |
| 5,995,978 A * | 11/1999 | Cullen et al. | | 707/104.1 |
| 6,023,714 A * | 2/2000 | Hill et al. | | 715/235 |
| 6,240,424 B1 | 5/2001 | Hirata | | |
| 6,426,761 B1 * | 7/2002 | Kanevsky et al. | | 715/788 |
| 6,466,237 B1 * | 10/2002 | Miyao et al. | | 715/838 |
| 6,542,635 B1 * | 4/2003 | Hu et al. | | 382/173 |
| 6,613,100 B2 * | 9/2003 | Miller | | 715/273 |
| 6,661,438 B1 * | 12/2003 | Shiraishi et al. | | 715/835 |
| 6,668,177 B2 * | 12/2003 | Salmimaa et al. | | 455/566 |
| 6,684,255 B1 * | 1/2004 | Martin | | 709/231 |
| 6,871,201 B2 * | 3/2005 | Yu et al. | | 707/737 |
| 6,883,138 B2 * | 4/2005 | Rosenholtz et al. | | 715/526 |
| 6,895,552 B1 * | 5/2005 | Balabanovic et al. | | 715/513 |
| 7,164,797 B2 * | 1/2007 | Simard et al. | | 382/218 |
| 7,171,618 B2 * | 1/2007 | Harrington et al. | | 715/229 |
| 7,180,618 B2 * | 2/2007 | Ueda et al. | | 358/1.15 |
| 7,328,407 B2 * | 2/2008 | MacLaurin | | 715/744 |

(Continued)

FOREIGN PATENT DOCUMENTS

| | | |
|---|---|---|
| EP | 0 206 214 A1 | 12/1986 |
| EP | 1 473 642 A1 | 11/2004 |
| JP | 10-021043 | 3/1997 |
| JP | 10-021043 | 1/1998 |

OTHER PUBLICATIONS

Janssen et al, UpLib: A Universal personal Digital Library System, Nov. 2003, ACM, pp. 234-242.*

(Continued)

*Primary Examiner* — Manglesh M Patel
(74) *Attorney, Agent, or Firm* — Blakely, Sokoloff, Taylor & Zafman LLP

(57) ABSTRACT

A method and apparatus is disclosed herein for generating visualizations (e.g., icons) suitable for a specific display. In one embodiment, the method comprises selecting a group of document images having similar layout features suitable for visualization or a specific display from the plurality of document images based on layout analysis information corresponding to the plurality of document images, and creating a plurality of visualizations to visualize document layout information for a group of document images based on one or more display device characteristics and based on content of the group of documents.

40 Claims, 14 Drawing Sheets

(56) References Cited

U.S. PATENT DOCUMENTS

| | | | |
|---|---|---|---|
| 8,001,466 B2* | 8/2011 | Kobayashi | 715/243 |
| 2001/0042085 A1 | 11/2001 | Peairs et al. | |
| 2002/0040375 A1* | 4/2002 | Simon et al. | 707/517 |
| 2003/0051207 A1* | 3/2003 | Kobayashi et al. | 715/500 |
| 2003/0074368 A1* | 4/2003 | Schuetze et al. | 707/103 R |
| 2004/0036912 A1* | 2/2004 | Liou et al. | 358/1.16 |
| 2005/0111737 A1* | 5/2005 | Das et al. | 382/190 |
| 2006/0265649 A1* | 11/2006 | Danilo | 715/542 |
| 2007/0061319 A1* | 3/2007 | Bergholz | 707/5 |
| 2007/0168856 A1* | 7/2007 | Berkner et al. | 715/517 |
| 2009/0138825 A1* | 5/2009 | Duarte | 715/838 |
| 2011/0167387 A1* | 7/2011 | Stallings et al. | 715/826 |

OTHER PUBLICATIONS

Harada et al., Lost in Memories: Interacting With Photo Collections on PDA's, Jun. 2004, pp. 325-333.*

European Search Report and European Search Opinion, Application No. EP 05 25 7912, mailed May 8, 2006 (11 pgs.).

D. Cai, et al., "Hierarchical Clustering of WWW Image Search Results Using Visual, Textual and Link Information", Proceedings of the 12*th* Annual ACM Int'l. Conference on Multimedia, Oct. 10, 2004, pp. 952-959, XP-0022377922.

X. He, et al. "ImageSeer: Clustering and Searching WWW Images Using Link and Page Layout Analysis", Microsoft Research Technical Report MSR-TR-2004-38, Apr. 1, 2004, XP-002377923.

D. Doermann, et al., "The Development of a General Framework for Intelligent Document Image Retriever", CAR-TR-835, CS-TR-3678, Aug. 1996, XP-002342750.

Japanese Office Action for corresponding Japanese Patent Application No. 2005-368490, Feb. 1, 2011, 2 pgs. *No English Translation Provided*.

Japanese Office Action for corresponding Japanese Patent Application No. 2005-368490, Feb. 1, 2011, 2 pgs. *No Translation Provided*.

* cited by examiner

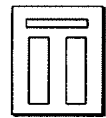
FIG. 5A
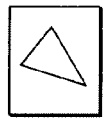
FIG. 5B
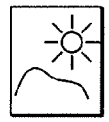
FIG. 5C
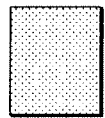
FIG. 5D
text
FIG. 5E
graphic
FIG. 5F
photo
FIG. 5G
color
FIG. 5H
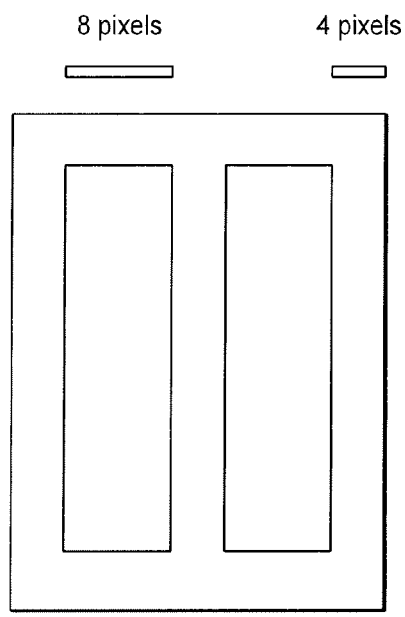
height = 1.3 x width
FIG. 6A
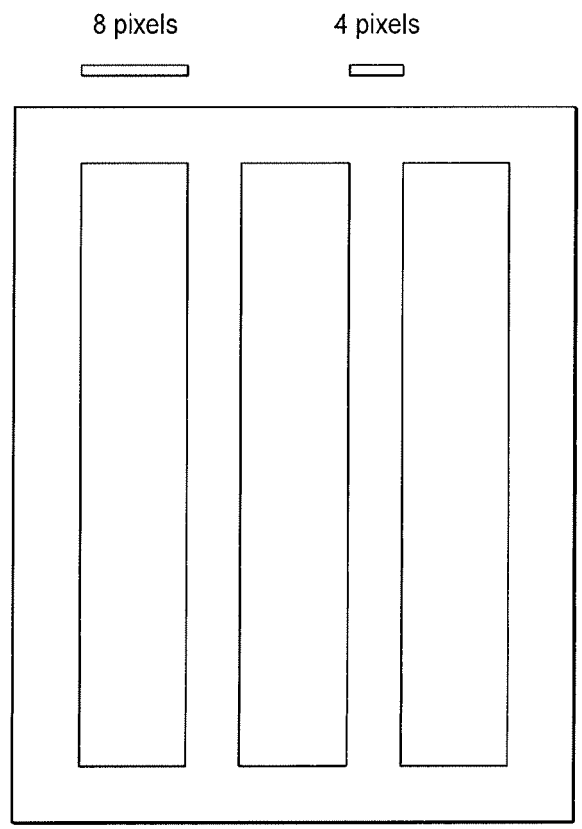
height = 1.3 x width
FIG. 6B

*FIG. 9*
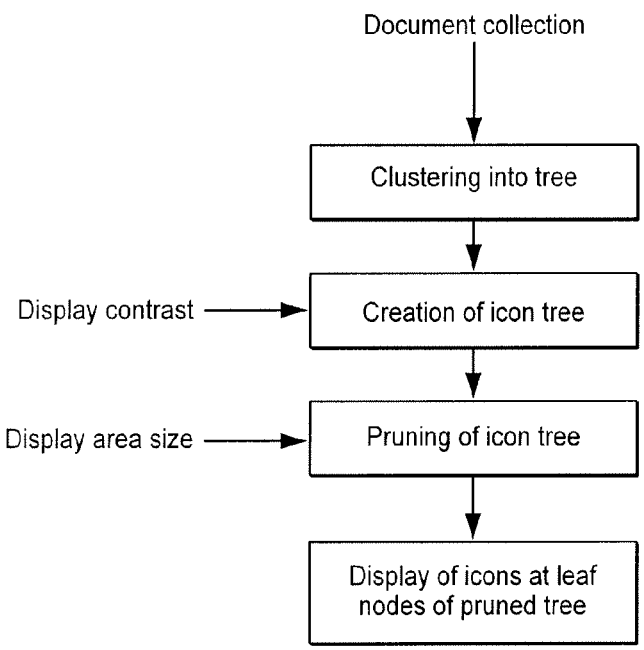
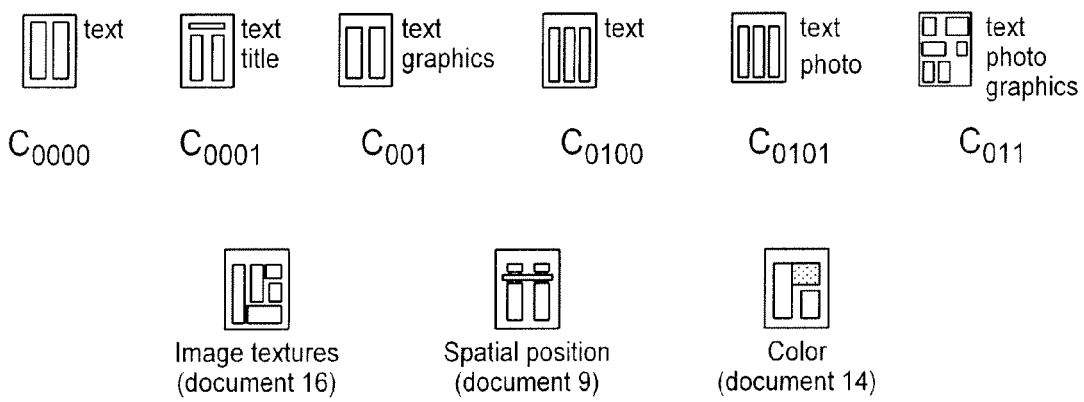
*FIG. 10*

DYNAMIC DOCUMENT ICONS

FIELD OF THE INVENTION

The present invention relates to the field of document processing; more particularly, the present invention relates to creating icons for individual documents and collection of documents.

BACKGROUND OF THE INVENTION

With ever increasing amounts of digital documents the challenges for retrieval algorithms become bigger and effective solutions more and more important. The field of document retrieval is widely researched with a main focus on extracting and evaluating text in documents.

Document retrieval techniques can be categorized as text-based and image-based retrieval techniques. Depending on which technique is used, the results are presented to the user using text and images, accordingly. For example, in content-based image retrieval (CBIR) application search results may be displayed as images since no text information is available. On the other hand, often document retrieval results are given in text form only, since text analysis (e.g., OCR) was the only analysis performed on the document image.

Thumbnails have been used in addition to text for representing retrieval results. The search algorithms used for retrieval are based on text features only, whereas the thumbnail images are just displayed as "some additional information" without any direct linkage to the text results, with the exception that they represent the same document.

Xerox' enhanced thumbnails are created pasting keywords found in HTML pages into the corresponding locations in the thumbnails.

Besides displaying a list of retrieved text results, text-based retrieval techniques may also display the structure of all or part of the underlying feature space derived from the document data base. The resulting images are visualizations of high-dimensional data, i.e. points in the feature space. Several methods exist to transform high-dimensional data into low-dimensional (2-dim.) data plots that can be displayed as an image. Example methods are dendrograms or multidimensional scaling techniques. Visualizations of document clusters using dendrograms are known in the art. For example, see van Liere, R., de Leeuw, W., Waas, F., "Interactive Visualization of Multidimensional Feature Spaces," in Proc. of Workshop on New Paradigms for Information Visualization, Washington D.C., November 2000. Multidimensional scaling (MDS) has been used in the prior art as well. For example, see Leouski, A., Allan, J., "Visual Interactions with a Multidimensional Ranked List," Proc. of the 21st Annual International ACM SIGIR Conference on Research and Development in Information Retrieval, pp. 353-354, 1998. An approach referred to as the Data Mountain approach allows the user to define his own spatial arrangement of thumbnails in a simulated 3-D environment. For more information, see Robertson, G., Czerwinski, M., Larson, K., Robbins, D., Thiel, D. & van Dantzich, M., "Data Mountain: Using spatial memory for document management," In Proceedings of UIST '98, 11th Annual Symposium on User Interface Software and Technology, pp. 153-162, 1998.

Text-only visualization of text-based retrieval results is performed by the software RetrievalWare from the company Convera, http://www.convera.com/Products/rw_categorization.asp. Given a list of text-based retrieval results, Convera provides the user with an automatic categorization of the retrieval results displayed in form of a limited number of folders with labels containing a characteristic word or phrase of a category. Convera calls the algorithmic technique dynamic classification. Results of the classification are visualized as folder images with attached text labels.

Use of text features in document retrieval, searching and browsing, is widely employed, whereas visual features are not commonly used. Besides simple listings of text results, visualizations of retrieval results published in the prior art consist either of traditional document thumbnails or of visualizations of the high-dimensional feature space, applying, e.g., dendrograms or multidimensional scaling techniques (see van Liere, R., de Leeuw, W., Waas, F., "Interactive Visualization of Multidimensional Feature Spaces," in Proc. of Workshop on New Paradigms for Information Visualization, Washington D.C., November 2000).

In the case of thumbnail visualizations, the algorithms used for thumbnail creation typically just downsample individual images. There is no explicit control over what features the user will recognize in the individual thumbnails, what information is lost, or what information is conveyed through a collection of thumbnails. An exception is the SmartNail technology that creates thumbnail-like images with focus on showing readable text and recognizable image portions. With the SmartNail technology, the thumbnail visualization is derived from information of a single image only and is not linked to any specific query-driven retrieval results. However, the current SmartNail technology computes image representations for individual images, not for document collections, with no knowledge on query information. For more information on SmartNails, see U.S. patent application Ser. No. 10/435,300, entitled "Resolution Sensitive Layout of Document Regions," filed May 9, 2003, published Jul. 29, 2004 (Publication No. 20040145593).

In the case of high-dimensional data visualization, the user is confronted with an abstract representation of potential features without any association to the document image. MDS and dendrogram visualizations do not convey information on the document image, only arrangements of extracted features. The Data Mountain approach uses conventional thumbnails arranged by the user following personal preferences. For a different user, the structure is not meaningful.

Since screen area is often very limited, it is not possible to show visualizations for each individual document on the screen. Therefore, it is natural to group documents that have similar features and associate each group with a label. This grouping, or clustering, is a common technique in retrieval applications. Clustering of retrieval results, in contrast to clustering the entire data set without having a query, is referred to herein as post-retrieval clustering. See, Park, G., Baek, Y., Lee, H.-K., "Re-ranking algorithm using post-retrieval clustering for content-based image retrieval," Information Processing and Management, vol. 41, no. 2, pp. 177-194, 2005 Clusters are typically created with respect to text features. Cluster labels are typically text descriptions of the common cluster content.

Clustering may be performed in other ways. In one exemplary document system textures are used to categorize and cluster documents in order to support query-by-example. Textures, describing document layout, are query inputs by the user. In one embodiment, the system uses a clustering algorithm to respond with returning documents matching the user-described document layout. Clustering algorithms (e.g., K-means or Sum-of-Square-Errors) may be employed to group documents with respect to traditional document features. These algorithms may return a set of cluster prototypes, visualized as icons, one of which can be used to perform a further query. For more information, see U.S. Pat. No. 5,933, 823, entitled "Image Database Browsing and Query Using Texture Analysis," issued Aug. 3, 1999.

In general, clustering techniques can be split into bottom-up and top-down techniques. The bottom-up, or agglomerative, techniques begin by treating each data point as its own cluster and then performing the merger of clusters on the way up to the top. The top-down, or divisive, techniques begin with all data being one cluster and then gradually breaking this cluster down into smaller and smaller clusters. For more information on devisive techniques, see, Duda, R. O., Hart, P. E., "Pattern Classification and Scene Analysis," Wiley, N.Y., 1973.

Another characterization of clustering techniques is monothetic vs. polythetic. In a monothetic approach, cluster membership is based on the presence or absence of a single feature. Polythetic approaches use more than one feature. See, Kummamuru, K., et al., "A Hierarchical Monlothetic Document Clustering Algorithm for Summarization and Browsing Search Results," Proceedings of the 13th international conference on World Wide Web, New York, N.Y., USA, pp. 658-665 p, 2004.

SUMMARY OF THE INVENTION

A method and apparatus is disclosed herein for generating visualizations (e.g., icons) suitable for a specific display. In one embodiment, the method comprises selecting a group of document images having similar layout features suitable for visualization or a specific display from the plurality of document images based on layout analysis information corresponding to the plurality of document images, and creating a plurality of visualizations to visualize document layout information for a group of document images based on one or more display device characteristics and based on content of the group of documents.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 5A-H illustrate examples of iconic representations.

FIG. 6A demonstrates usage for two-columns-text-only documents.

FIG. 6B demonstrates usage for three-columns-mixed-content.

FIG. 9 illustrates a schematic overview of such a system.

FIG. 10 shows document icons for the leaf clusters created in FIG. 7A, as well as examples for dydocons representing individual page layout information.

DETAILED DESCRIPTION OF THE PRESENT INVENTION

Figure 1:
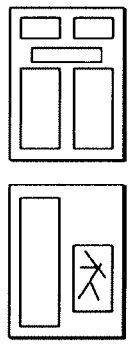
FIG. 1 shows examples of descriptions of visual document layout features of images using a new iconic visualization.

A method and apparatus for visualization of document retrieval results are described. The results are displayed with dynamic document icons. In one embodiment, these icons reflect geometric and logical information contained in a document collection and adapt to changes of display characteristics, document content, and/or user input. In one embodiment, each visualization maps algorithmically determined information about the documents under consideration of display characteristics and user input to perceived information.

In one embodiment, the visualization of individual documents and document collections emphasizes communicating general layout information (e.g., geometric and logical). In one embodiment, in order to overcome some of the drawbacks of the prior art, iconic images are produced that contain information about logical and geometric features of the documents, expressed in visual form. In one embodiment, the iconic representations represent geometric and logical layout information throughout document collections and yet surrender readability of text.

The selection of layout information of a document image may be improved and potentially optimized, to ensure that the information contained in the visualization helps by the user to recognize a document. For example, if in a conventional thumbnail view, thumbnails of all results shown on a screen page look the same (since high resolution features lost in the downsampling process were the only discriminative features), then the information can be conveyed by showing only one of those thumbnails acting as a unifying visualization for all documents on the screen page. This would allow having more space for additional text results. In one embodiment, the unifying thumbnail visualization most likely contains only high-level document information (e.g., column layout information). Visualization of such a column layout is possible by an iconic representation, even smaller than the initial thumbnail size. The user could still recognize a column layout, assuming that the contrast between column and background is large enough.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

The dynamic document icons communicate general layout information (e.g., geometric and logical) of documents and document collections. Such information is described by features derived from the documents. With focus on visualization of document specific features, in one embodiment, the feature space is narrowed to document features that provide the user with information that can be visualized more easily than expressed by a text description. General features that are easily recognizable visually, but much harder to explain by text, are shape, texture, position, and color. In one embodiment, these general features are linked to document specific features in the following way.

shape→rectangular shapes of document zones, columns
texture→text (bold and plain), graphic, image
position→zone location, reading order
color→spot color, color images and graphics FIG. 1 shows examples of descriptions of visual document layout features by images using a new iconic visualization. If column layout, title and image location are the information that needed to be conveyed to the user, then the iconic visualizations express that information in a reduced size in comparison to regular-size thumbnails or text-only versions.

Many features discussed above are available as the result of a document layout analysis. These include, but are not limited to, bounding boxes of document zones, grouping into columns and reading order. These may be obtained in a manner well-known in the art, such as Aiello M., Monz, C., Todoran, L., Worring, M., "Document Understanding for a Broad Class of Documents," International Journal on Document Analysis and Recognition (IJDAR), vol. 5(1), pp. 1-16, 2002. Furthermore, in one embodiment, zones are classified according to their content. In one embodiment, three classes are considered: text, graphic, and image content, and text zones are further classified as title or section heading.

In one embodiment, a partitioning of the features into two categories, geometrical and logical features, is performed. Geometric features include, for example, column layout and location of zones, whereas logical features include, for example, zone content and text characterization.

Besides a division into geometric and logical features, in one embodiment, a hierarchical structure can be imposed. A column is created from document zones. The content of a zone may be text, including a title, or an image including a text caption.

Figure 2:
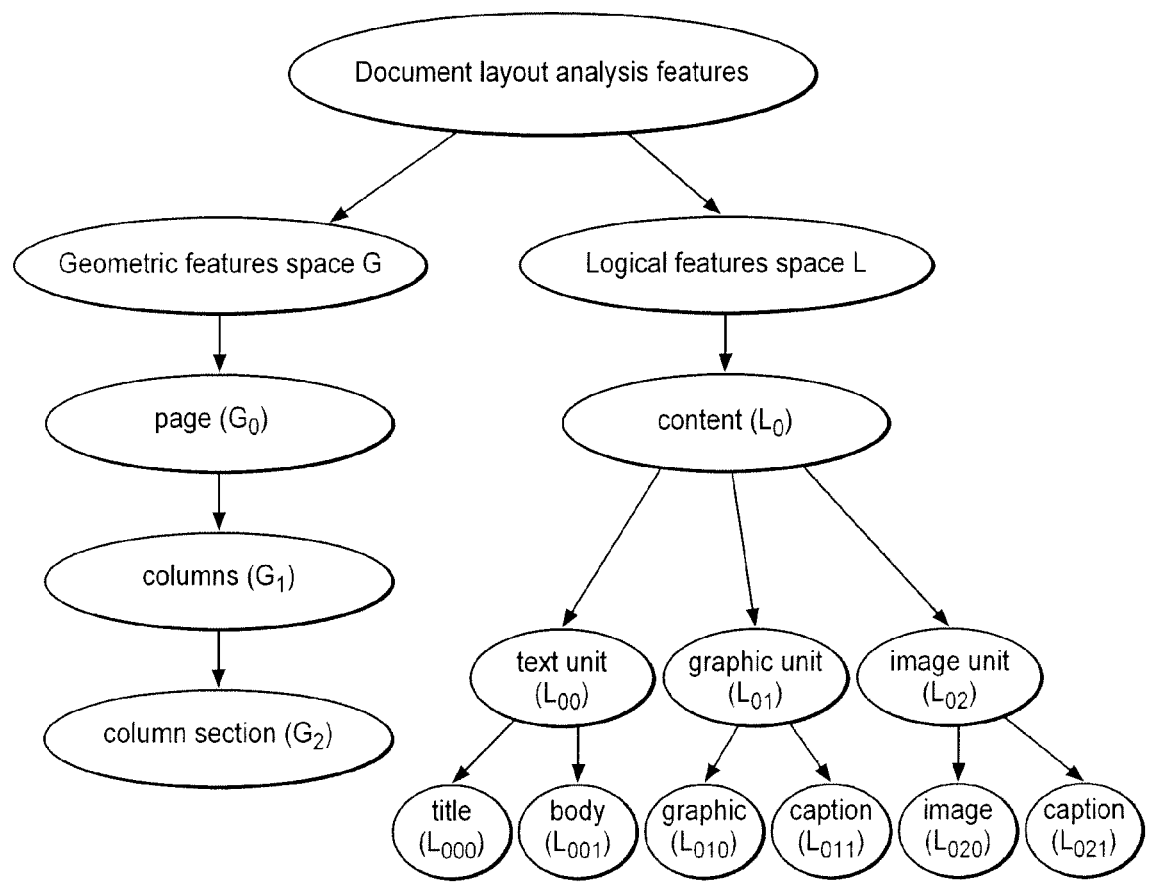
FIG. 2 illustrates one embodiment of a hierarchical organization of layout analysis features divided into geometric and logical features.

FIG. 2 illustrates one embodiment of a hierarchical organization of layout analysis features, divided into geometric and logical features. The document feature space is divided into a logical feature space L and a geometrical feature space G. In one embodiment, the features $L_i$ in L and $G_i$ in G are ordered hierarchically, denoted by $L_0 > L_1 > \ldots > L_n$, and $G_0 > G_1 > \ldots > G_m$.

An Exemplary Dynamic Document Icon Generation System

In one embodiment, a dynamic document icon generation system generates visualizations of clusters of document images. Each visualization contains document layout features. In one embodiment, text is suppressed in the visualization. Thus, original layout features are visualized and readability of text is neglected. In contrast to the prior art, visualizations depend not only on the document content, but also on the constraints given by the display device. Examples for those constraints include, but are not limited to, contrast ratio, device resolution (absolute number of pixels and relative dpi) and monochrome-vs.-color.

Figure 3:
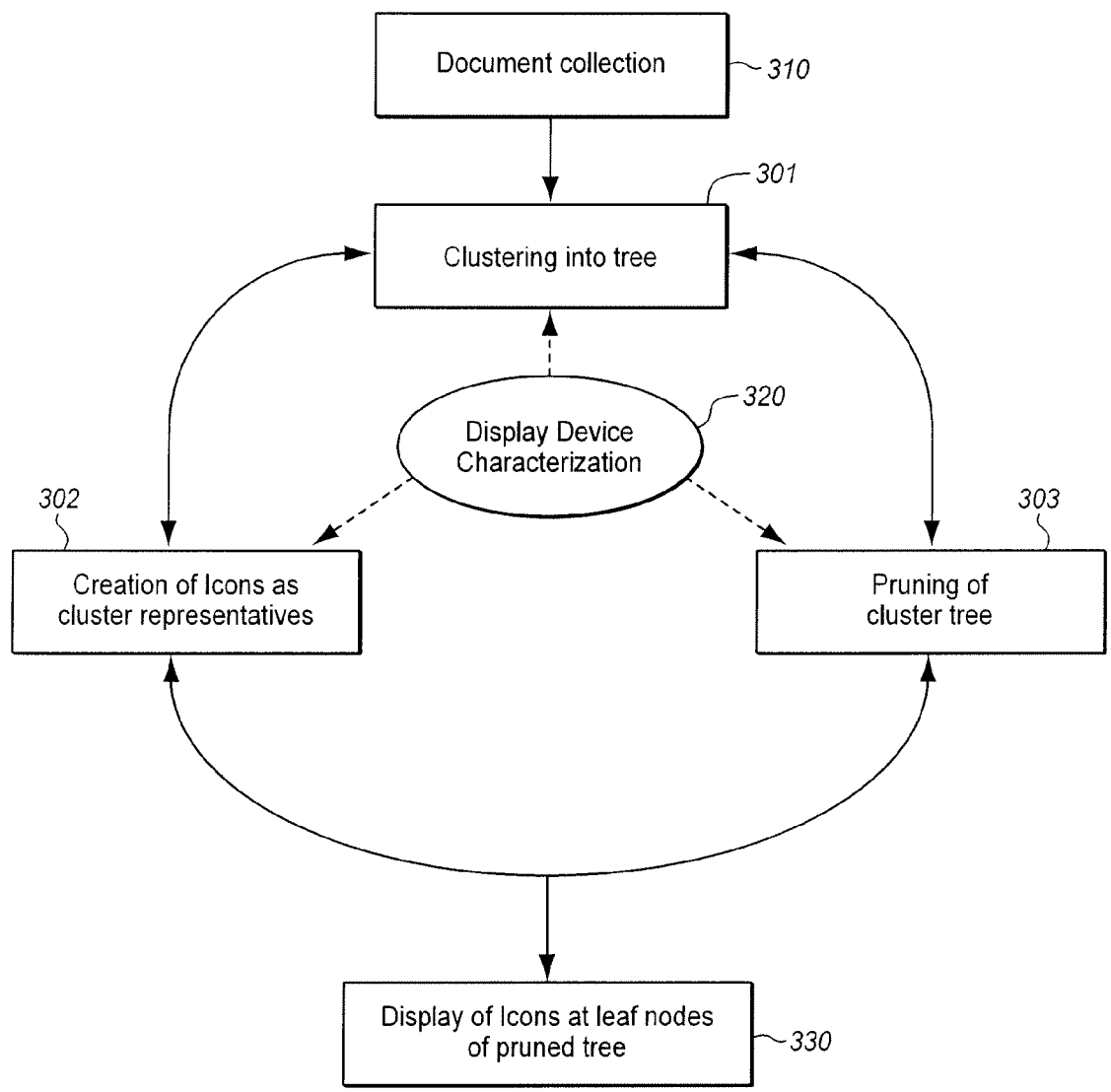
FIG. 3 gives a schematic overview of a display-adaptive visualization system for document layout features.

In one embodiment, the system comprises three units: a tree-clustering unit, an icon-creation unit, and a tree-pruning unit. Each of these units may operate based on display characteristics of the display device that is to display the dynamic document icons. FIG. 3 gives a schematic overview of a display-adaptive visualization system for document layout features. Referring to FIG. 3, tree-clustering unit 301 clusters document images in collection 310 into a tree. In one embodiment, tree-clustering unit 301 may operate based on display device characteristics 320. An icon creation unit 302 creates icons as cluster representatives in response to tree-clustering unit 301 clustering document collection 310 into the tree, as well as in response to tree pruning unit 303 pruning the cluster tree. One or both of the icon creation unit 302 and tree pruning unit 303 may operate based upon display device characteristics 320. The output of the system are iconic representations (icons) 330 from leaf nodes of the pruned tree.

The system of FIG. 3 operates on a set of documents. This set may be the result of a text query or a collection in a file folder. Structural information about the layout of the documents is assumed to be available.

Clustering Documents Into a Tree

In one embodiment, documents are clustered using post-retrieval clustering with respect to visualizable features. In each clustering step, a unique geometric or logic feature is chosen to drive a split decision. In that way, the creation of visual labels (in iconic form) unambiguously reflecting the clustering decisions with respect to logical and geometric features will be possible.

In one embodiment, the clustering technique splits the data into sets with homogeneous features, i.e. ideally a clearly dominating logical or geometric feature. In one embodiment, motivated by common searching practice of starting with broad search criteria and fine tuning them successively, divisive techniques are used, instead of agglomerative hierarchical clustering, since the complete cluster hierarchy from root to leafs will not be needed.

In one embodiment, hierarchical monothetic divisive approach is chosen. Monothetic is chosen over polythetic because the discriminative property between final clusters requires to be turned into a non ambiguous-visualization. In this approach, at each level i in the hierarchy, the current data set is clustered individually according to the chosen features $L_k$ and $G_l$. In one embodiment, the clustering is performed using the Min-max Cut (MMC) algorithm, which is well-known in the art (Ding, C. H. Q, et al., "A Min-max Cut Algorithm for Graph Partitioning and Data Clustering," Proc. Int'l Conference on Data Mining, San Jose, Calif., pp. 107-114, 2001). Alternatively, a k-means algorithm could be used; however the MMC is thought to have superior performance (Leouski, A., Allan, J., "Visual Interactions with a Multidimensional Ranked List," Proc. of the 21st Annual International ACM SIGIR Conference on Research and Development in Information Retrieval, pp. 353-354, 1998).

In one embodiment, tree clustering unit 301 applies a monothetic (single feature), divisive (top-down) hierarchical clustering technique to document images. At each clustering step a binary split is performed. The three zone characteristics position and shape (hierarchically structured), zone texture, zone color define three directions in the global document feature space. These subspaces of the feature space are denoted by $F_1, F_2, F_3$.

Figure 4:
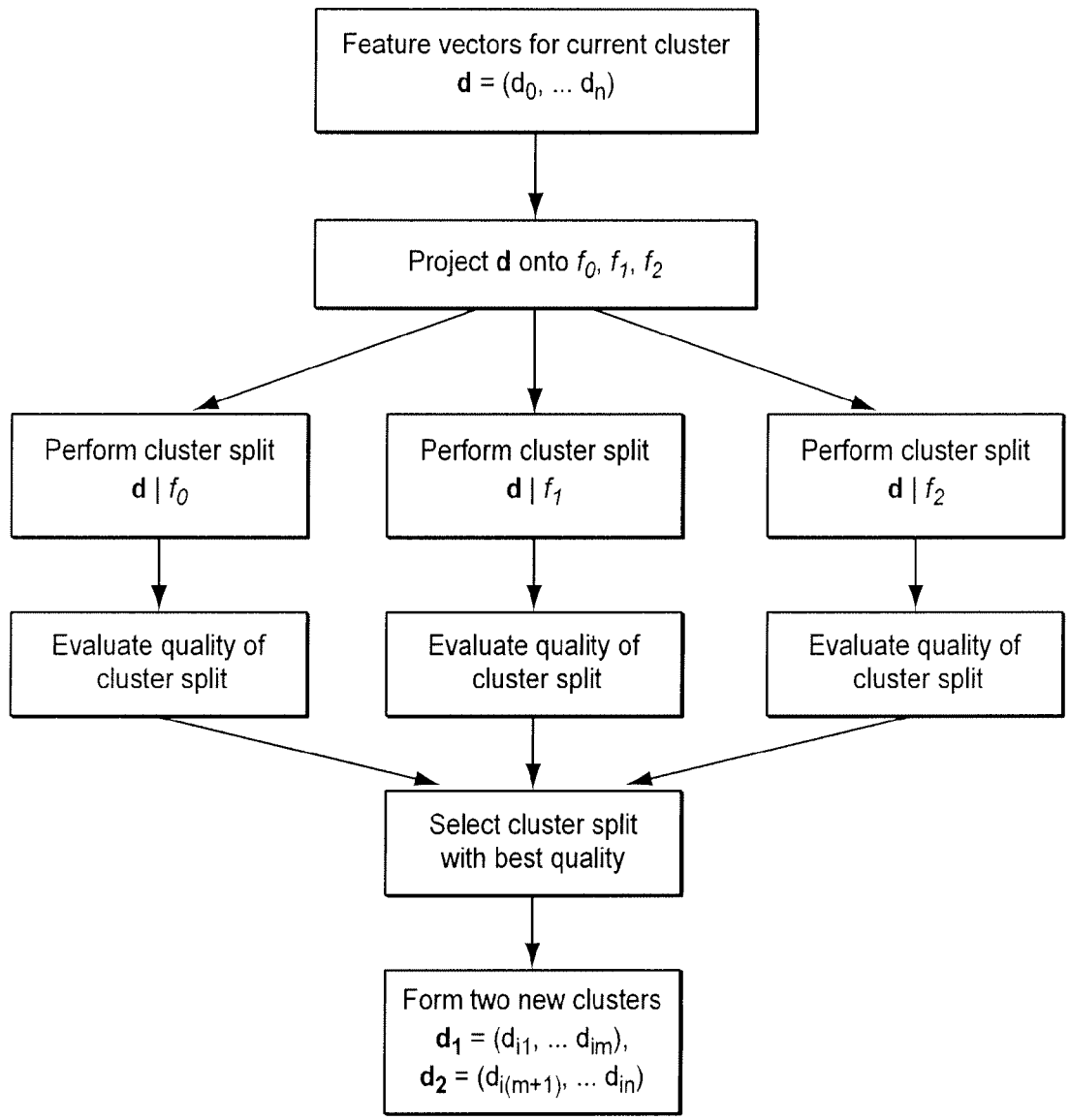
FIG. 4 shows an overview of one embodiment of a splitting procedure.

At each clustering step, the current feature data of the current document set is projected onto each of the individual subspace of feature space. The resulting feature vectors are processed by a Min-max Cut algorithm described below. In one embodiment, the algorithm attempts to maximize similarity of feature vectors within a cluster and maximize similarity of feature vectors between two different clusters. Under the condition that the similarity within a cluster is sufficiently large, the cluster split for each feature subspace is evaluated and the best one chosen as the final clustering split. That way the clustering split is performed in a preferred subspace of the feature space. FIG. 4 shows an overview of the splitting procedure.

Min-Max Cut Algorithm

In one embodiment, the tree clustering unit 301 uses a Min-Max algorithm as part of the clustering process. In one embodiment, the clustering method used is that described in Ding, C. H. Q, et al., "A Min-max Cut Algorithm for Graph Partitioning and Data Clustering," Proc. Int'l Conference on Data Mining, San Jose, Calif., pp. 107-114, 2001.

Given a data set D of n elements and an n×n association (or weight) matrix W, the goal is to find a partitioning of D into subsets A and B that meets the min-max principle—minimize similarity between clusters and maximize similarity within a cluster. The similarity or association between two data elements u and v is given by the matrix entry $w_{uv}$. The similarity between subsets A and B is the cut size $$\text{cut}(A, B) = W(A, B) \tag{1}$$

with $$W(A, B) = \sum_{u \in A, v \in B} w_{uv}$$

and $W(A) := W(A, A)$.

The goal is now to minimize cut(A,B) and maximize W(A) and W(B) simultaneously. In one embodiment, this is achieved by the objective function given below $$M\text{cut}(A, B) = \frac{\text{cut}(A, B)}{W(A)} + \frac{\text{cut}(A, B)}{W(B)} \tag{2}$$

Assuming the matrix W is given in the canonical form given below $$W = \begin{bmatrix} W_A & W_{A,B} \\ W_{A,B} & W_B \end{bmatrix} \tag{3}$$

the Fiedler vector of W has to be determined. The Fielder vector is the second eigenvector of W corresponding to the second largest eigenvalue (the largest eigenvalue is 1). Sorting the Fiedler vector results in a useful linear search order.

Following the order given by the sorted Fiedler vector, the Mcut function from Eq. (2) is evaluated. In one embodiment, the lowest Mcut value corresponds to the optimal cut point.

A refinement of this cut point may be performed by a linkage-based refinement method, such as, for example, that refinement method described in Ding, C. H. Q, et al., "A Min-max Cut Algorithm for Graph Partitioning and Data Clustering," Proc. Int'l Conference on Data Mining, San Jose, Calif., pp. 107-114, 2001. This method checks the points close to the computed cut point for possible local improvement of the cut.

In one embodiment, the MMC algorithm is applied in a hierarchical fashion to the document collection using the geometric and logical features. In one embodiment, at each step in the hierarchical clustering algorithm, the cluster with the least similarity inside of the cluster is identified. That cluster is then split into two new clusters twice, once using the geometric feature and once using the logical feature. The splits are evaluated and the "better" split, i.e. the split that produces the most similar new clusters is chosen. The similarity measured in the clustering algorithm is measured for normalized features, such that similarity measures from different feature sets are comparable. One way to perform such a normalization is to interpret the data projected onto a feature space subspaces as realizations of a random variable with a probability density distribution, i.e. the data are an empirical pdf. A random variable X can be normalized via the well known formula $(X-E(X))/STD(X)$. After performing such a normalization, the best split with respect to a certain subspace of feature space $F_{dir}$ is measured by the function Mcut from Eq. (2) above at an optimal cut point given by the two sets $$(A|F_i^*, B|F_i^*).$$

The selection of the winning cluster split out of all subspace of feature space can be computed as $$F_{i*} = \mathrm{argmax}_{F_i} Mcut(A|F_i^*, B|F_i^*).$$

The following pseudo code contains details of one embodiment of hierarchical geometric-logic clustering.

---

```
MAX_iter = 10
T = 0.01
I = ∅
H(F_i) = maximal hierarchy level for feature subspace F_i
while (iter < MAX_ITER) and (max{sim(v)|v in V_L} > T) and
(k < K) and (m < M)
    find leaf node v with smallest similarity value sim(v) of associated
data cluster, set D = data(v)
    for i=1:N
        if (h(F_i) < H(F_i))
            compute optimal split of current data set D into A_i = A|F_i
and
            B_i = B|F_i projected onto the subspace F_i using the Mcut
algorithm.
            add i to valid index set I
        end
    end
    if (I ≠ ∅)
        compute i* = arg min_{i∈I} w(Mcut(A|F_i,B|F_i))
        split data set D into sets A|F_{i*} and B|F_{i*}
        add two new leaf nodes representing A|F_{i*} and B|F_{i*} to V_L
        remove node representing D from V_L
        iter ++
    else
        iter = MAX_ITER % stop iteration
    end
    I = ∅
end
```

---

Icon Tree—Icons as Cluster Representatives

After clustering has partitioned the document collection into groups that can be labeled by distinct visualizable features representing high level document information, those features have now to be turned into a visualization satisfying one or more conditions. In one embodiment, the visualization satisfies the following condition: select information, potentially optimal information, to be contained in the visualization from cluster label features that are perceivable by the user on a given available screen area. This condition prevents the creation of images that attempt to visualize cluster-label-features, but fail to convey the information in a specific display environment due to too little contrast at edges, too small text, indistinguishable shades of color, etc.

Clusters are typically labeled with cluster representatives. In order to visualize properties of the features vectors contained in a cluster, an iconic representation of layout information contained in the cluster is chosen as a cluster representative. In one embodiment, an icon is construed in the following way.

Iconic elements are created for individual layout features. Document zones are represented by rectangles. Textures by selected fillings of text zones or labels. For example, text is visualized by fillings with shades of gray (e.g., light gray for plain text, dark gray for bold text). An image is visualized by an image icon, graphics by a graphic icon. Examples are shown in FIGS. 5A-H. Referring to FIGS. 5A-H, examples from left to right include plain and bold text, graphic, photo, color, text label, photo label, and color label.

In one embodiment, each element, including a "whitespace element," has a predetermined fixed minimal size, and scaling below that minimal size is not allowed. The minimal size depends on one or more display properties such as, for example, contrast ratio. Displays with higher contrast ratio allow a smaller minimal size than displays with lower contrast ratio.

Each split in the clustering procedure adds one of the icon elements to the already created icon for the parent cluster. In order to force distinguishability between icon elements, all elements of the parent icon may have to be scaled in order to guarantee that the newly added elements doe not need to be scaled below its minimal size. That way the size of the complete icon depends on the clustering procedure. An example for icons of different size for two and three column text layout is explained in the following.

Let minimal dimensions for the elements whitespace w and text zone t be given $s_{min}[w]=4$ pixels, $s_{min}[t]=8$ pixels. Picturing two columns in an icon means that two rectangles of minimal dimension 8 have to placed, separated and enclosed by whitespace of minimal dimension 4. That results in a minimal width of 28 pixels. In order to preserve the aspect ratio of the original document, the height of the icon is determined as 28 ($height_{orig}/width_{orig}$). For an 8½ by 11 inch letter size document, the icon size results to 28×36.4 pixels. An analogue calculation results in an icon size of 40×52 pixels when picturing three columns. Since each node in the cluster tree is represented by an icon, the cluster tree is transformed into an icon tree. The visualizations of the nodes of this icon tree are called dynamic document icons. FIGS. 6A and 6B illustrates the example of icon creation picturing two and three column layout. Referring to FIGS. 6A and 6B, the complete two-column icon is 28×36 pixels in size, while the three-column icon is 40×52 pixels in size in order to guarantee minimal sizes for the individual elements.

Figure 7A:
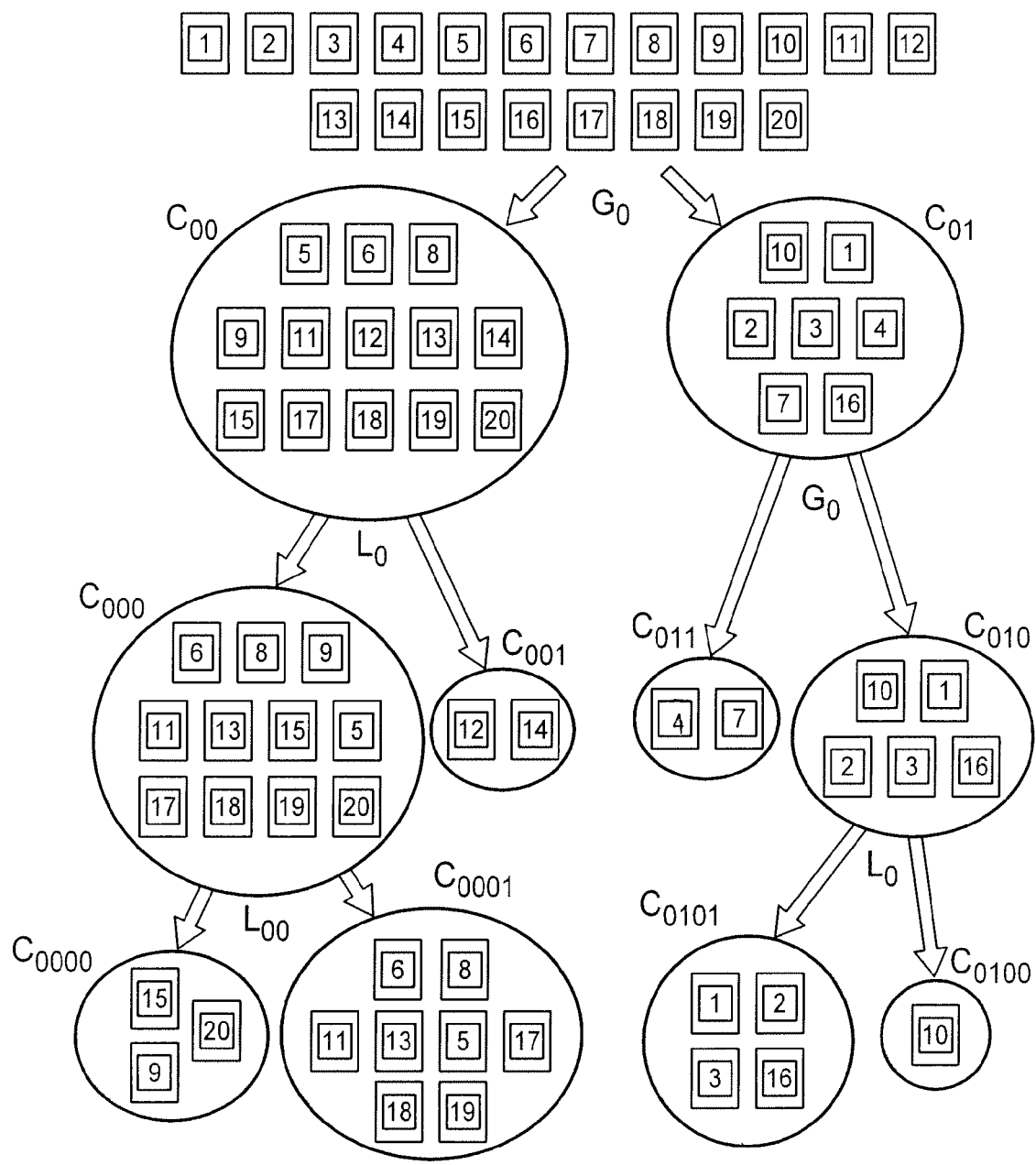
FIG. 7A is an example of a cluster tree with leaf nodes.

The cluster tree in FIG. 7A results from applying the hierarchical geometric-logic clustering to a subset of 20 documents of the MediaTeam data base (Article folder) (MediaTeam Oulu Document Database, www.mediateam.oulu.fi/MTDB/). These articles are laid out in various column formats containing text, graphics or images. The data base comes with layout analysis information for each document. This information contains characterization of document zones, content type (text, graphic, image), reading order, column layout, etc.

In the example, a maximum of only two levels of hierarchy are considered in the feature space, one level of geometric and two levels of logical features. The geometric feature $G_0$ is the number of columns, the logical feature $L_0$ is the distribution of document content with respect to text, graphics, and images. The second level of logical feature hierarchy, the $L_{00}$ feature, represents a title as a sub category of text. The feature space for the example set is shown in Table 1 below.

TABLE 1

Geometric (column 1) and logic (column 2–5) features for example set of 20 documents.

| Document # | 1 # of columns | 2 % of text | 3 % of graphics | 4 % of images | 5 title |
|---|---|---|---|---|---|
| 1 | 3 | 0.6932 | 0.0398 | 0.2670 | yes |
| 2 | 3 | 0.6517 | 0.0004 | 0.3478 | no |
| 3 | 3 | 0.5306 | 0.1968 | 0.2724 | yes |
| 4 | 5 | 0.7400 | 0 | 0.2600 | yes |
| 5 | 2 | 1.0 | 0 | 0 | no |
| 6 | 2 | 1.0 | 0 | 0 | no |
| 7 | 1 | 0.0180 | 0.9820 | 0 | no |
| 8 | 2 | 1 | 0 | 0 | no |
| 9 | 2 | 1 | 0 | 0 | yes |
| 10 | 3 | 1 | 0 | 0 | no |
| 11 | 2 | 1 | 0 | 0 | no |
| 12 | 2 | 0.5285 | 0.4715 | 0 | no |
| 13 | 2 | 1 | 0 | 0 | no |
| 14 | 2 | 0.6853 | 0.3147 | 0 | no |
| 15 | 2 | 1 | 0 | 0 | yes |
| 16 | 3 | 0.6796 | 0.0010 | 0.3193 | yes |
| 17 | 2 | 1 | 0 | 0 | no |
| 18 | 2 | 1 | 0 | 0 | no |
| 19 | 2 | 1 | 0 | 0 | no |
| 20 | 2 | 1 | 0 | 0 | yes |

The final cluster hierarchy is up to four levels deep and divides the document collection into sub-collections containing two-columns-text-only-with-title, two-columns-text-only-without-title, two-columns-mixed-content, three-columns-text-only, three-columns-mixed-content and not-two-or-three-column documents.

Pruning of Icon Tree in Order to Fit Display Size Constraints

The leaf nodes of the icon tree are used as visualizations of groups of documents. Given a specific available display area, it may not be possible to display all leaf node icons at their original size. With pruning the icon tree from bottom to top, the number of leaf nodes decreases, and the icon sizes may decrease. In one embodiment, the icon tree is pruned until the set of leaf node icons fits into the available display area. If the display area is large, less pruning has to be performed compared to the case that the display area is small. FIGS. 7A-E show the leaf nodes and the remaining leaf nodes after tree pruning for three different display areas. FIG. 7A is an example of a cluster tree with leaf nodes.

The number of clusters, the size of the display screen, and the content of the document collection influence the visualization. With a change of display size, the visualizations should change as well. The same is true for changes to the document collection content. Due to these dependencies, each change in the input conditions may change the iconic visualizations. Therefore, the iconic visualizations are dynamic, i.e., dynamic document icons.

Figure 7B:
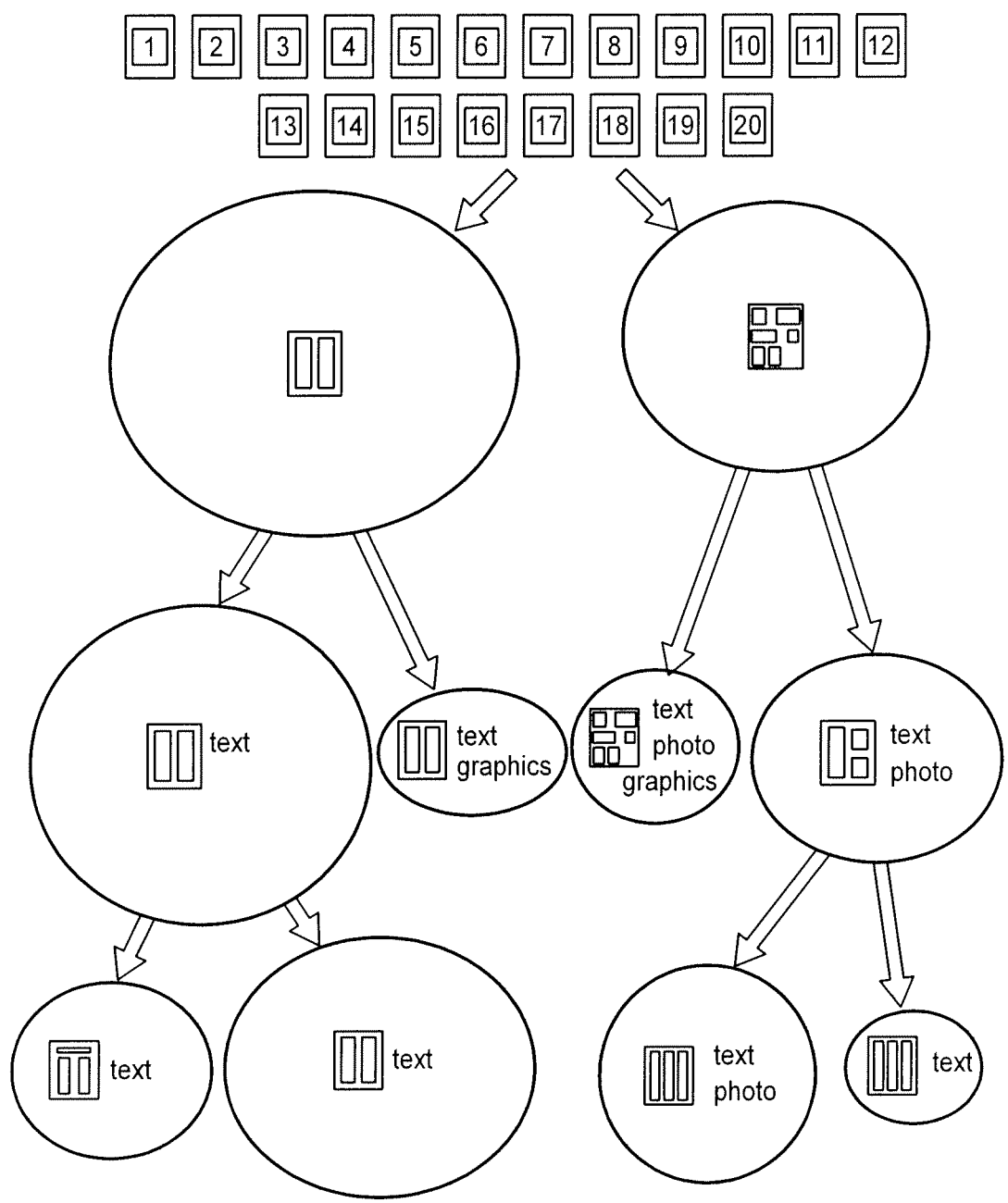
FIG. 7B illustrates the cluster tree of FIG. 7A with an iconic representation for each node on the tree.

FIG. 10 shows dynamic document icons for the leaf clusters created in FIG. 7A, as well as examples for dynamic document icons representing individual page layout information. FIG. 7B illustrates the cluster tree of FIG. 7A with an iconic representation for each node on the tree.

Figure 7C:
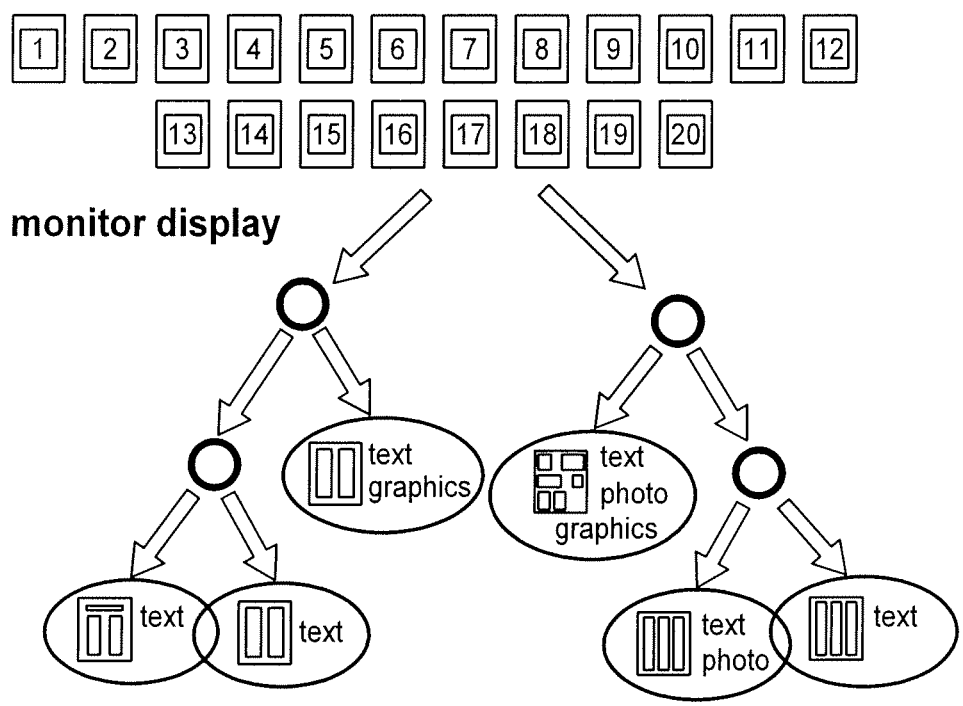
FIG. 7C illustrates the portions of the cluster tree of FIG. 7B that are displayable on a monitor display.
Figure 7D:
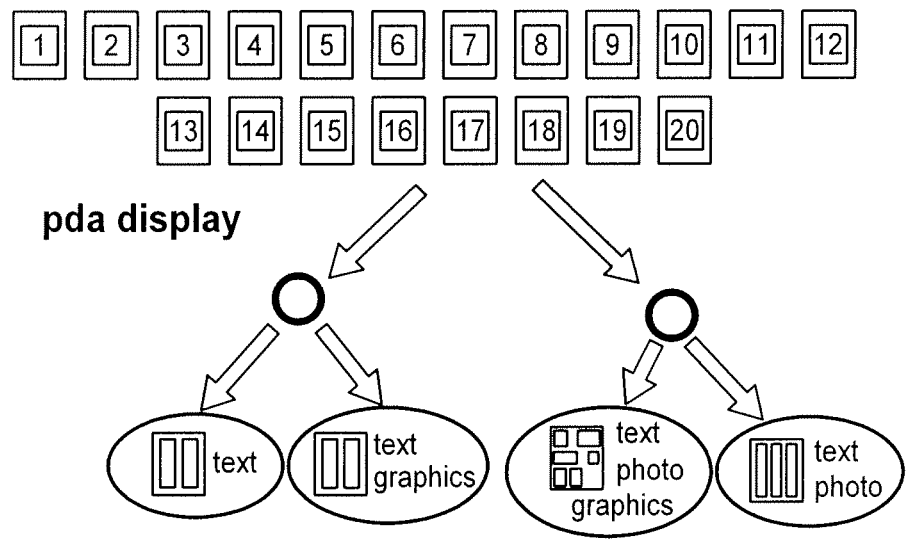
FIG. 7D illustrates the portions of the cluster tree of FIG. 7B that are displayable on a PDA display.
Figure 7E:
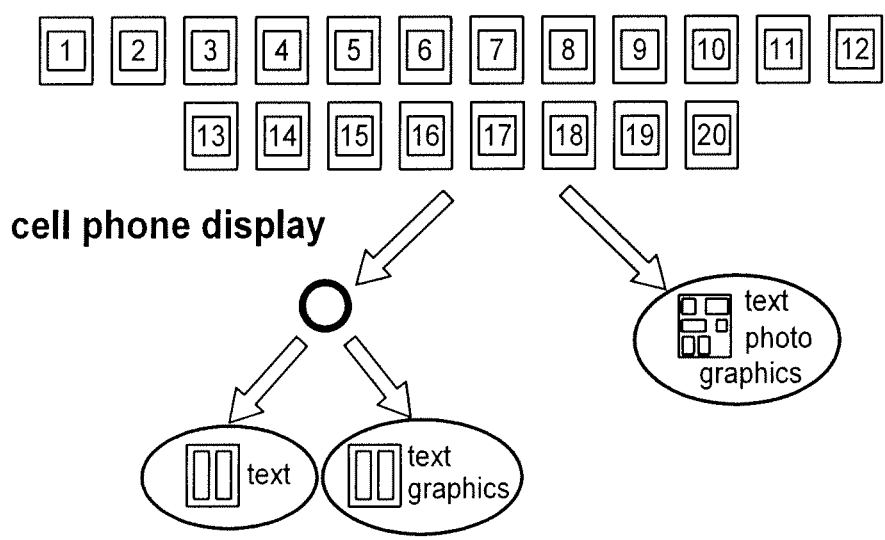
FIG. 7E illustrates the portions of the cluster tree of FIG. 7B that are displayable on a cell phone display.

FIG. 7C illustrates the portions (in bold) of the cluster tree of FIG. 7B that are displayable on a monitor display. FIG. 7D illustrates the portions (in bold) of the cluster tree of FIG. 7B that are displayable on a PDA display. FIG. 7E illustrates the portions (in bold) of the cluster tree of FIG. 7B that are displayable on a cell phone display. In one embodiment, the cluster tree is implemented using a tree data structure representation.

Exemplary Tree Pruning

Tree pruning can be performed in various ways. Below, three methods are explained in detail. The pruning method chosen in an implementation may depend on the application or the user's preference.

Let $v_k$ denote all the nodes in the icon tree. Find all nodes $v_{k_i}$, such that $v_{k_i}$ is a leaf node and all children of the parents of the $v_{k_i}$ are also leaf nodes. This set is called the leaf node set and is denoted by $V_L = \{(v_{k_i})\}$. The set of parent nodes of the leaf node set is denoted by $V_P = \{P(v_{k_i})\}$.

Pruning can be performed by removing all the children of a node in $V_P$ in order to guarantee that all documents are represented by icons of the leaf nodes of the pruned tree.

1) Pruning with respect to cluster split quality: Each node in $V_P$ has a cluster split evaluation associated with it, given by the value of the objective function Mcut from Eq. 2 applied to the two sets re1resented in the node's children (leaf) nodes. Pruning of the leaf nodes is performed by first finding the parent node in $V_P$ with the largest Mcut value and then removing all the children of that parent node (elements of $V_L$).

2) Pruning with respect to icon size: Each node in $V_L$ has a geometric size associated with it, given by the dimensions $i_x, i_y$ of the icon. The geometric area of the icon is then given by $i_x \cdot i_y$. Pruning of the leaf nodes is done by first determining the pair of leaf nodes $v_{i1}, v_{i2}$ that are siblings and that have the largest (or smallest) geometric area and then removing those leaf nodes $v_{i1}, v_{i2}$.

3) Pruning with respect to number of cluster elements: Each node has an integer number called node count associated with it. The node count represents the number of documents contained in the cluster, which is represented by the node. Pruning of the leaf nodes is done by first determining that pair of leaf nodes $v_{i1}, v_{i2}$ that are siblings and that have the smallest sum of node counts, i.e.

$$\text{node\_count}(v_{i1}) + \text{node\_count}(v_{i2}) = \text{maximal}$$

and then removing those leaf nodes $v_{i1}, v_{i2}$. Alternatives to the selection criterion are $$\max(\text{node\_count}(v_{i1}), \text{node\_count}(v_{i2})) = \text{minimal, or}$$

$$\min(\text{node\_count}(v_{i1}), \text{node\_count}(v_{i2})) = \text{minimal.}$$

4) Pruning with respect to hierarchical level: Each node v has a hierarchical level h(v) associated with it. This level denotes the distance of the node v from the root of the tree. Pruning of the leaf nodes is done by first determining that pair of leaf nodes $v_{i1}, v_{i2}$ that are siblings and that have the largest hierarchical level $h(v_{i11}) = h(v_{i22})$ and then removing those leaf nodes $v_{i1}, v_{i2}$.

5) Pruning with respect to smallest similarity in clusters: Each node v has a similarity value sim(v) associated with it. This similarity value reflects the similarity of the data inside the cluster (e.g. average (maximum) distance between pair of data points). Pruning of the leaf nodes is done by first determining that pair of leaf nodes $v_{i1}, v_{i2}$ that are siblings and that have the largest combined similarity $\text{sim}(v_{i1}) + \text{sim}(v_{i2})$ or $\max(\text{sim}(v_{i1}), \text{sim}(v_{i2}))$, and then removing those leaf nodes $v_{i1}, v_{i2}$.

6) Combinations of pruning criteria is also possible, e.g. remove those leaf nodes $v_{i1}, v_{i2}$ that are siblings and that satisfy $$h(v_{i11}) + \text{node\_count}(v_{i11}) + \text{node\_count}(v_{i22}) = \text{maximal}$$

After pruning, a determination is made as to whether the icons representing the nodes of the pruned tree fit into the available display area. Given a display area of width W and height H, with leaf nodes $v_i \epsilon V_L$ ($V_L$=set of leaf nodes), the system checks whether the icons fit into the display area following a simple linear horizontal packing order $$\sum_{v_i \in V_L} i_x v_i \le W \qquad (4)$$

where $i_x(v_i)$ is the width of the icon representing node $v_i$. If that condition is satisfied, all icons fit into the display area. Fitting of icons into the available display can also be obtained using other methods that allow more complicated layout of documents, such as, for example, the techniques described in R. Johari, J. Marks, A. Partovi, and S. Shieber, "Automatic Yellow-Pages Pagination and Layout," Journal of Heuristics, pp. 321-342, 1997; Kusiak A and Heragu S S, "The facility layout problem," Eur J Opl Res 29: 229-251, 1987; and R. Francis, L. McGinnis, and J. White, Facility Layout and Location: An Analytical Approach, 2nd edition, Prentice Hall. If they do not fit, another pruning step follows.

In one embodiment, the two processing steps clustering and tree pruning are combined into one if the targeted display and its constraints are known a priori. After each clustering step, a determination is made as to whether the newly generated icons fit the available display area given some layout rules or constraints. If the icons do not fit, then the just generated leaf nodes are removed and no clustering is further performed in that branch of the cluster tree. The following pseudo code explains this procedure in more detail. The terminology of OPEN and CLOSED lists of tree nodes is taken from Nils J. Nilsson, "Artificial Intelligence," Morgan Kaufmann Publishers, Inc., San Francisco, 1998.

1. Create a search tree T, consisting solely of the root node $v_0$. Put $v_0$ on an order list called OPEN.
2. Create a list called CLOSED that is initially empty
3. If OPEN is empty, exit with failure
4. Select first node v* on OPEN, remove V* from OPEN
5. Add v* to CLOSED
6. Expand v*, generating the children nodes $v^*_1$, $v^*_2$
7. Compute L(vis(Vopen)∪vis($v^*_1$)∪vis($v^*_2$)), where L is the function calculating the quality of the layout fit. If there is not fit possible L takes on the value ∞.
8. If L(vis(Vopen)∪vis($v^*_1$)∪vis($v^*_2$))<∞, add $v^*_i$ to OPEN
9. If the area of vis($v^*_i$) is smaller than the area of available display space after placing vis(Vopen)∪vis($v^*_1$)∪vis($v^*_2$), remove $v^*_i$ from OPEN
10. Order Open with respect to one of the tree pruning criteria cluster split quality, icon size, number of cluster elements, hierarchical level, smallest similarity inside a cluster, etc.
11. Go to step 4

Figure 14:
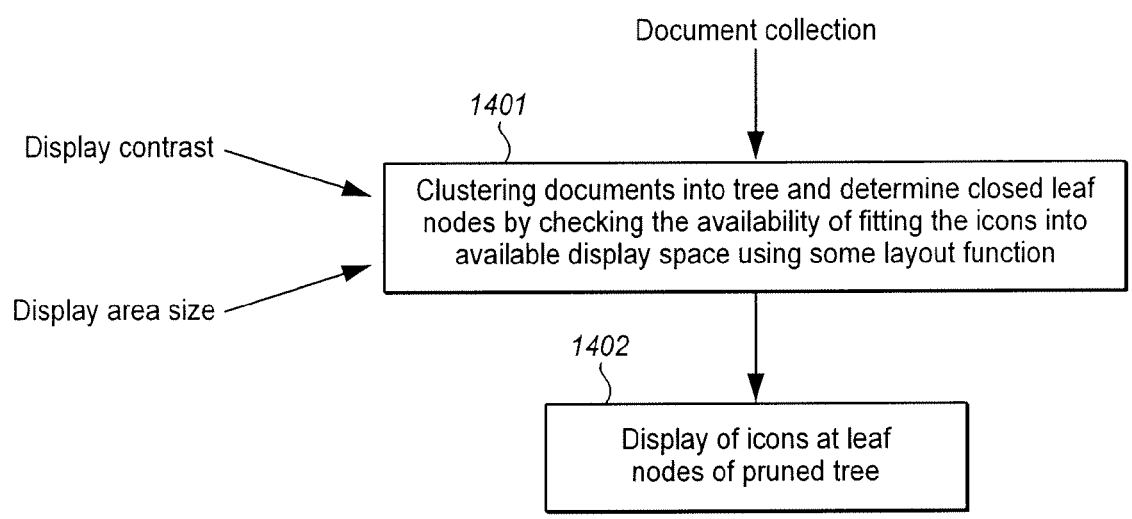
FIG. 14 is a flow diagram depicting combined clustering and pruning.

FIG. 14 is a flow diagram of one embodiment of a process that includes combined clustering and pruning. The process is preferred by processing logic to that may comprise hardware (e.g., circuitry, dedicated logic, etc.), software (such as is run on a general purpose computer system or a dedicated machine), or a combination of both. Referring to FIG. 14, processing logic clusters documents into a tree and identifies closed leaf nodes by checking the availability of fitting the icons into available display space using a layout function (processing block 1401). This is performed in response to receiving a document collection and displaying constraints (e.g., display contrast and display area size). Next, processing logic displays icons at leaf nodes of the pruned tree (processing block 1402).

Figure 8:
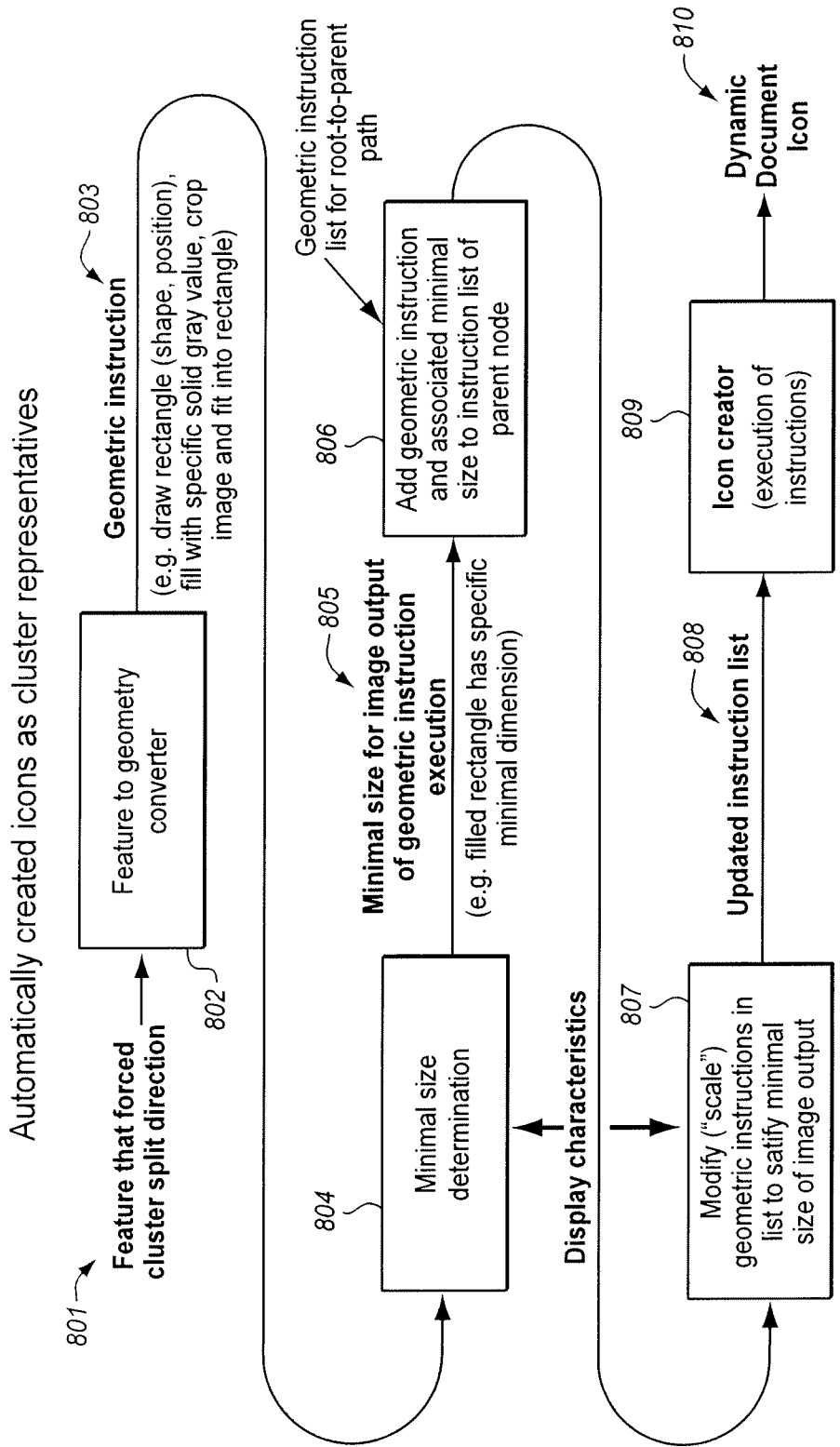
FIG. 8 is a flow diagram of one embodiment of a process for automatically creating icons as a cluster representation.

FIG. 8 is a flow diagram of one embodiment of a process for automatically creating icons as a cluster representation. The process is performed by processing logic that may comprise hardware (e.g., circuitry, dedicated logic, etc.), software (such as is run on a general purpose computer system or a dedicated machine), or a combination of both.

Referring to FIG. 8, the process starts with processing logic receiving a feature that forced a cluster split direction (processing block 801). In response thereto, processing logic performs a feature-to-geometry conversion (processing block 802). The result of the conversion is one or more geometric instructions 803. For example, the geometric instructions may direct the system to draw a rectangle (shape, position), fill the rectangle with a specific solid gray value, crop an image, and fit the image into a rectangle.

Processing logic then makes a minimal size determination (processing block 804) in order to determine the minimal size (805) for the image output of the geometric instruction execution (e.g., the filled rectangle has specific minimal dimensions).

Using the minimal size for the image output 805, processing logic adds the geometric instruction(s) and associated minimal size to an instruction list of the parent node (processing block 806) and modifies (e.g., scales) the geometric instructions in the list to satisfy the minimal size of the image output (processing block 807) to produce an updated instruction list (808). Processing logic creates a dynamic document icon 810 using an icon creator to execute instructions in the updated instruction list 808 (processing block 809).

Thus, in one embodiment, the system comprises a clustering tool, an icon creation tool and a tree pruning tool, in which the display characteristics influence the icon creation and the tree pruning. A schematic overview of such a system is shown in FIG. 9.

Exemplary Applications

Figure 11:
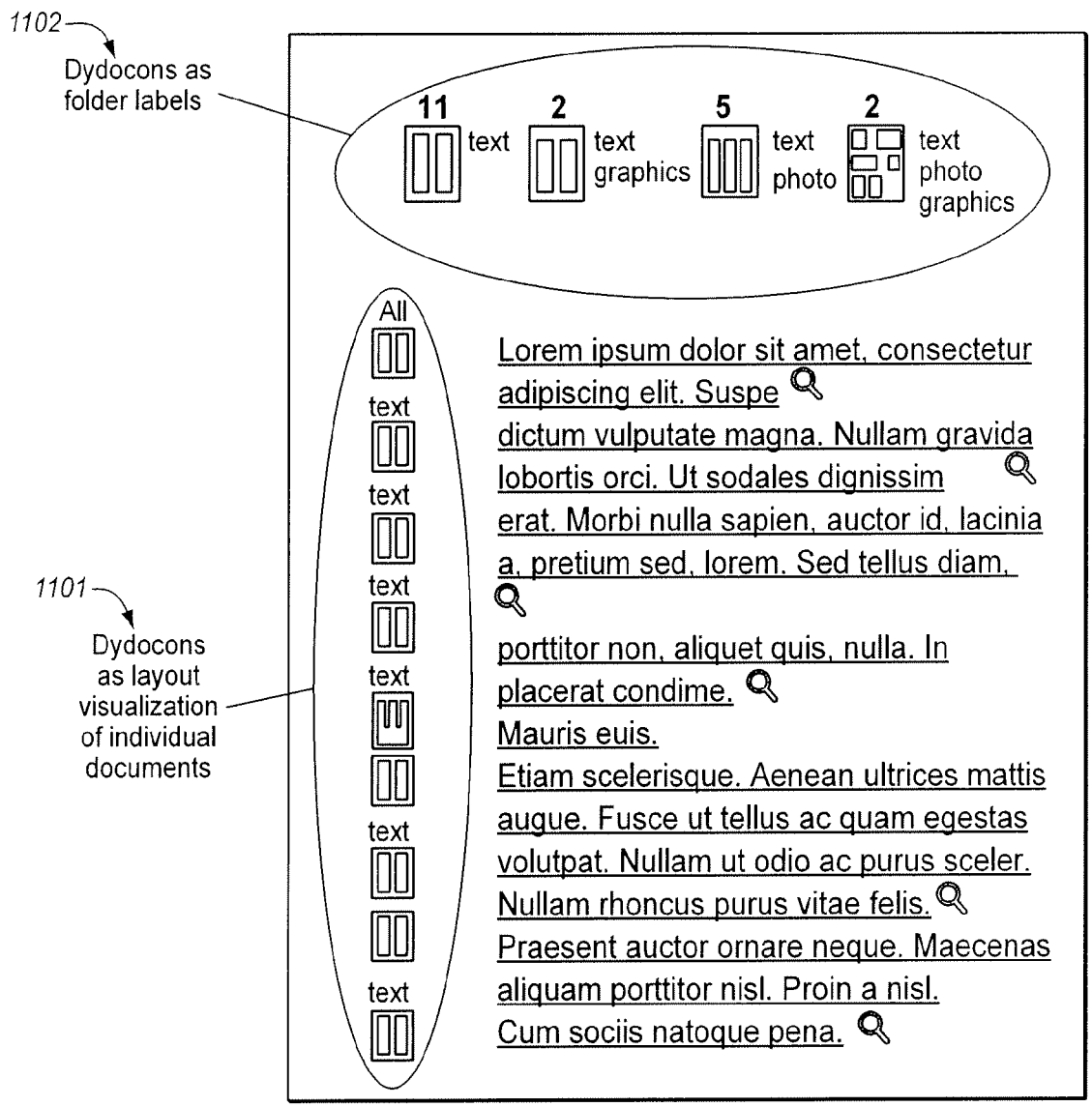
FIG. 11 shows such an example of retrieval results displayed on a PDA-like display.

One possible use of dynamic document icons is to add them to the text results in order to visualize individual page layout information and/or display them as a cluster labels or "folder symbols." FIG. 11 shows such an example of retrieval results displayed on a PDA-like display using dynamic document icons 1101 to the left and dynamic document icons 1102 to the top as follows.

Starting from dynamic document icons as folder symbols a possible usage scenario is to add a linkage structure to the folder symbols such that clicking on them creates a new view showing retrieval results for those documents that are contained in the chosen dynamic document icon cluster. This usage is demonstrated for two-columns-text-only documents in FIG. 6A and for three-columns-mixed-content in FIG. 6B. Notice that in the FIG. 6A scenario, another level of logical feature hierarchy is added by showing dynamic document icons for documents containing text and a title and documents containing text only and no title. In the FIG. 6B scenario, text results were not available to the documents because they were not written in English, but in German and Finnish. When documents contain image zones, dynamic document icons show low resolution versions of the original image content at the appropriate places in the icon.

Other applications of dynamic document icons is for searching and browsing. Searching is narrowly specified for a particular document given some specific information, such as a title. Browsing, in contrary, does not have a well defined goal, but satisfies the need to learn more about the document collection. Using these definitions, dynamic document icons may in general support a browsing task better than a search task.

Algorithmically-Controlled Perceivable Information

The visualization techniques described herein incorporates the content of document collections, as well as geometric properties of visualizations, and links these elements with percievability of results by the user and constraints given by display devices. The concept is explained in more details below. In prior art, one way display characteristics, such as screen area, are considered by setting a fixed number for retrieval results on the first page. For example, Google shows 10 results on the first web page. Depending on the size of the browser window, the user may not perceive information on all 10 results, but may have to scroll to receive the information for all 10 results.

Figure 12:
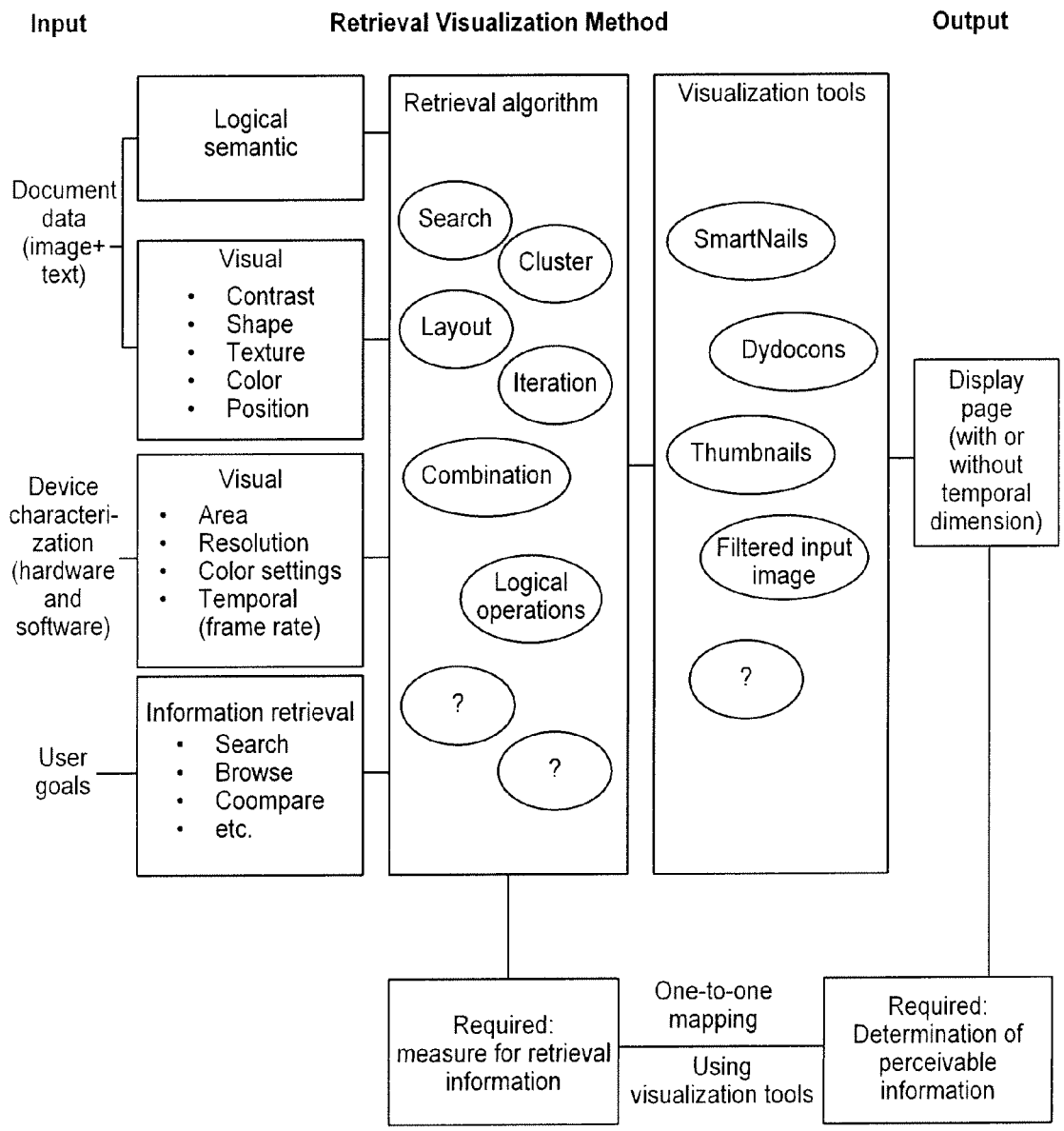
FIG. 12 shows a schematic overview of the separation into input, output, retrieval algorithms and visualization tools including the mapping between algorithmically measured retrieval and perceivable information.

Given the input parameters and the image as an output media the goal of a retrieval visualization algorithm needs to be to compute and visualize retrieval data and make sure that the user can perceive the information contained in those data. To achieve this goal, information is determined or measured in various ways. On the one hand, information needs to be measured inside of algorithms used for tasks like searching, clustering, creating layouts, etc. This information is called algorithmically measured retrieval information. On the other hand, the information that is perceived by the user through the final visualization image needs to be determined. This information is called perceivable information (examples may include readability recognizability, differentialability). In order to map algorithmically measured retrieval information to perceivable information, visualization tools like Smart-Nails (see U.S. patent application Ser. No. 10/435,300, entitled "Resolution Sensitive Layout of Document Regions," filed May 9, 2003, published Jul. 29, 2004 (Publication No. 20040145593)) and dynamic document icons are used. They are called visualization tools. A schematic overview of the separation into input, output, retrieval algorithms and visualization tools including the mapping between algorithmically measured retrieval and perceivable information is shown in FIG. 12.

At a technical level the division into algorithmically measured retrieval and perceivable information leads to the central question of how to determine and measure perceivable information in visualizations of document retrieval results (especially challenging is the example of measuring information about collections of documents). Once there is a measure for this information a mapping between perceivable and algorithmically extracted retrieval information needs to be defined. This would allow the algorithmic control of perceivable information. Therefore, the concept illustrated in FIG. 12 is called Algorithmically-Controlled Perceivable Information.

Traditional visualizations such as traditional thumbnails or dendrograms fit into the concept as cases in which the mapping between the retrieval information and perceivable information has not been established or controlled, and the display characteristics are missing as an input.

An Exemplary Computer System

Figure 13:
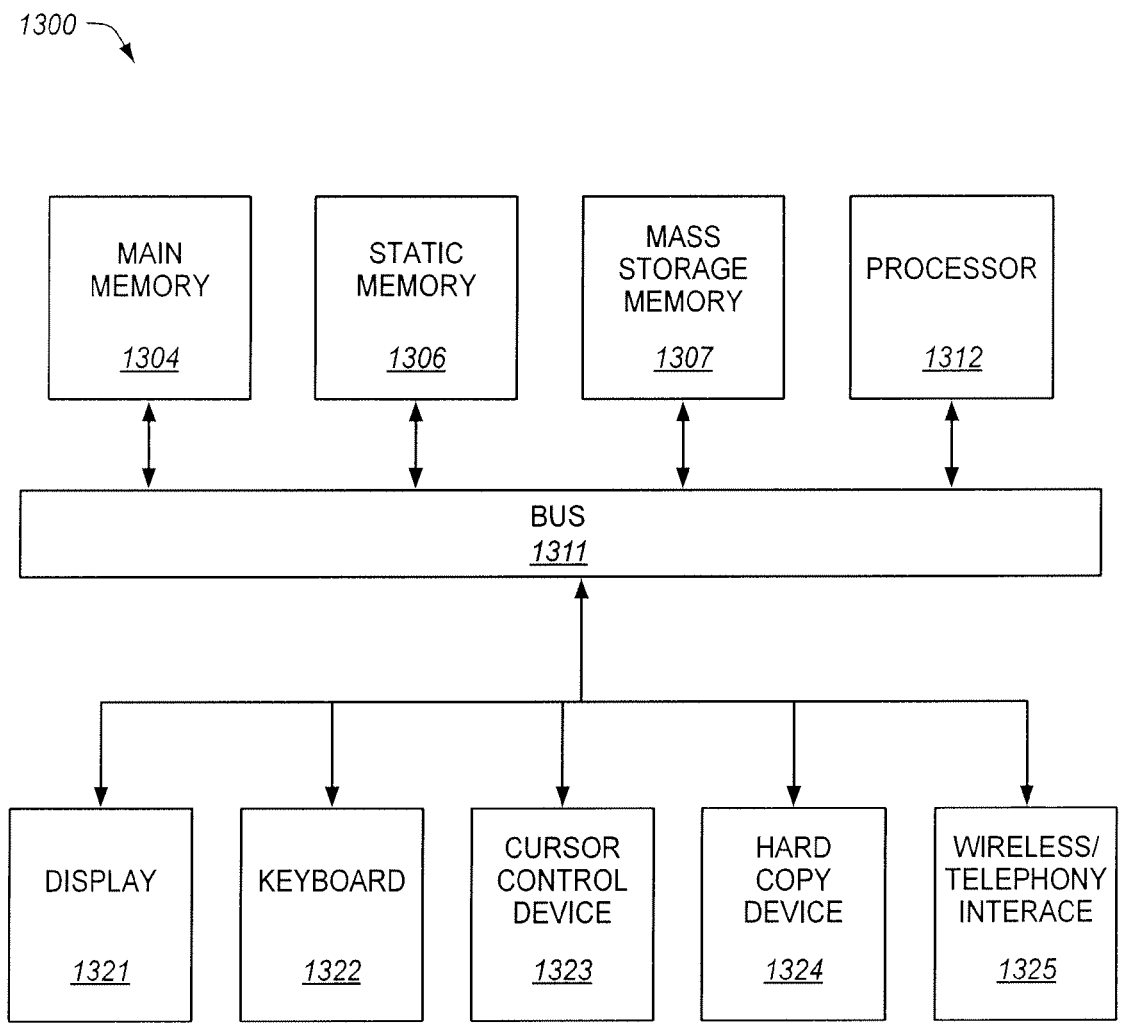
FIG. 13 is a block diagram of an exemplary computer system that may perform one or more of the operations described herein.

FIG. 13 is a block diagram of an exemplary computer system that may perform one or more of the operations described herein. Referring to FIG. 13, computer system 1300 may comprise an exemplary client or server computer system. Computer system 1300 comprises a communication mechanism or bus 1311 for communicating information, and a processor 1312 coupled with bus 1311 for processing information. Processor 1312 includes a microprocessor, but is not limited to a microprocessor, such as, for example, Pentium™, PowerPC™, Alpha™, etc.

System 1300 further comprises a random access memory (RAM), or other dynamic storage device 1304 (referred to as main memory) coupled to bus 1311 for storing information and instructions to be executed by processor 1312. Main memory 1304 also may be used for storing temporary variables or other intermediate information during execution of instructions by processor 1312.

Computer system 1300 also comprises a read only memory (ROM) and/or other static storage device 1306 coupled to bus 1311 for storing static information and instructions for processor 1312, and a data storage device 1307, such as a magnetic disk or optical disk and its corresponding disk drive. Data storage device 1307 is coupled to bus 1311 for storing information and instructions.

Computer system 1300 may further be coupled to a display device 1321, such as a cathode ray tube (CRT) or liquid crystal display (LCD), coupled to bus 1311 for displaying information to a computer user. An alphanumeric input device 1322, including alphanumeric and other keys, may also be coupled to bus 1311 for communicating information and command selections to processor 1312. An additional user input device is cursor control 1323, such as a mouse, trackball, trackpad, stylus, or cursor direction keys, coupled to bus 1311 for communicating direction information and command selections to processor 1312, and for controlling cursor movement on display 1321.

Another device that may be coupled to bus 1311 is hard copy device 1324, which may be used for printing instructions, data, or other information on a medium such as paper, film, or similar types of media. Furthermore, a sound recording and playback device, such as a speaker and/or microphone may optionally be coupled to bus 1311 for audio interfacing with computer system 1300. Another device that may be coupled to bus 1311 is a wired/wireless communication capability 1325 to communication to a phone or handheld palm device.

Note that any or all of the components of system 1300 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method comprising:
receiving a plurality of documents, where each document of the plurality of documents is represented by a document image depicting graphical features including a layout of content within the document image;
clustering the plurality of document images into groups of document images according to discriminative visualizable features, wherein each group includes one or more document images having similar layout features for content within the one or more document images where the layout features are suitable for visualization on a type of display device, and wherein similarity of the layout features is based on analysis of a layout of discriminative visual features for content within the plurality of document images, further comprising:
dividing a feature space into subspaces according to visualization characteristics, projecting feature vectors onto feature subspaces of the feature space, clustering document images in each of the feature subspaces, and selecting one cluster split from one or more cluster splits for each of the feature subspaces;

determining one or more display device characteristics of a specific display device of the type of display device; and for each group of document images:

creating a visualization to represent the group of document images based on the one or more determined display device characteristics and the discriminative visual features for content within the document images, wherein the visualization is mapped to content of the group of document images; and providing the visualization for display on the specific display device.

2. The method defined in claim 1 further comprising:

extracting visualizable document layout features from the plurality of document images; and grouping document images from the plurality of document images into the group of document images based on the visualizable document layout features.

3. The method defined in claim 2 further comprising separating the document layout features into categories, wherein grouping of document images is based on the categories.

4. The method defined in claim 3 wherein the categories include two or more of geometric descriptions of document zones, zone texture and zone color.

5. The method defined in claim 3 wherein the categories include geometric descriptions of document zones and zone content.

6. The method defined in claim 3 wherein separating the document layout features comprises performing hierarchical clustering.

7. The method defined in claim 1, further comprising selecting visual cluster representatives.

8. The method defined in claim 7 wherein visual cluster representatives are selected from a cluster tree.

9. The method defined in claim 8 further comprising reducing potential visual cluster representatives from the cluster tree based on display area constraints.

10. The method defined in claim 1 wherein creating the plurality of visualizations comprises:

creating an iconic representation of document layout as a collection of iconic visual elements; and reducing one or more leaf node clusters based on display and layout constraints.

11. The method defined in claim 10 wherein icon size of the iconic representation is based on content properties of the visual elements.

12. The method defined in claim 10 wherein icon size of the iconic representation is based on display contrast.

13. The method defined in claim 1 wherein selecting one cluster split from the cluster splits for each of the feature subspaces comprises reducing a cluster tree from leafs to associated roots until all leaf nodes of the cluster tree fit into the display area.

14. The method defined in claim 1 wherein the visualizations comprise a plurality of iconic representations.

15. The method defined in claim 1 wherein the document layout information represents one or more similarities between document images in the group of document images.

16. The method defined in claim 1 wherein the document layout information represents one or more differences between document images in the group of document images.

17. The method defined in claim 1 wherein the one or more display device characteristics comprises available display area on the display device.

18. The method defined in claim 1 wherein the one or more display device characteristics comprises contrast ratio of the display device.

19. The method defined in claim 1 wherein the one or more display device characteristics comprises resolution of the display device.

20. The method defined in claim 1 wherein the one or more display device characteristics comprises limited color spectrum of the display device.

21. The method defined in claim 1 wherein the one or more discriminative visual features comprises one or more selected from a group consisting of: shape, position, texture, and color of at least one image object.

22. The method defined in claim 1 further comprising suppressing text in the plurality of visualizations.

23. The method defined in claim 1 further comprising forming the group of document images based on the one or more similar layout features.

24. An article of manufacture having one or more non-transitory recordable media storing instructions thereon which, when executed by a system, cause the system to perform a method comprising:

receiving a plurality of documents, where each document of the plurality of documents is represented by a document image depicting graphical features including a layout of content within the document image;

clustering the plurality of document images into groups of document images according to discriminative visualizable features, wherein each group includes one or more document images having similar layout features for content within the one or more document images where the layout features are suitable for visualization on a type of display device, and wherein similarity of the layout features is based on analysis of a layout of discriminative visual features for content within the plurality of document images, further comprising:

dividing a feature space into subspaces according to visualization characteristics, projecting feature vectors onto feature subspaces of the feature space, clustering document images in each of the feature subspaces, and selecting one cluster split from one or more cluster splits for each of the feature subspaces;

determining one or more display device characteristics of a specific display device of the type of display device; and for each group of document images:

creating a visualization to represent the group of document images based on the one or more determined display device characteristics and the discriminative visual features for content within the document images, wherein the visualization is mapped to content of the group of document images; and providing the visualization for display on the specific display device.

25. The article of manufacture defined in claim 24 wherein the method further comprises:

extracting visualizable document layout features from the plurality of document images; and grouping document images from the plurality of document images into the group of document images based on the visualizable document layout features.

26. The article of manufacture defined in claim 25 wherein the method further comprises separating the document layout features into categories, wherein grouping of document images is based on the categories.

27. The article of manufacture defined in claim 26 wherein the categories include two or more of geometric descriptions of document zones, zone texture and zone color.

28. The article of manufacture defined in claim 26 wherein the categories include geometric description of document zones and zone content.

29. The article of manufacture defined in claim 26 wherein separating the document layout features comprises performing hierarchical clustering.

30. The article of manufacture defined in claim 24 further comprising selecting visual cluster representatives.

31. The article of manufacture defined in claim 30 wherein visual cluster representatives are selected from a cluster tree.

32. The article of manufacture defined in claim 31 wherein the method further comprises reducing potential visual cluster representatives from the cluster tree based on display area constraints.

33. The article of manufacture defined in claim 24 wherein creating the plurality of visualizations comprises:
   creating an iconic representation of document layout as a collection of iconic visual elements; and
   reducing one or more leaf node clusters based on display and layout constraints.

34. The article of manufacture defined in claim 33 wherein icon size of the iconic representation is based on content properties of the visual elements.

35. The article of manufacture defined in claim 33 wherein icon size of the iconic representation is based on display contrast.

36. The article of manufacture defined in claim 24 wherein the one or more display device characteristics comprises available display area on the display device.

37. The article of manufacture defined in claim 24 wherein the one or more display device characteristics comprises contrast ratio of the display device.

38. The article of manufacture defined in claim 24 wherein the one or more display device characteristics comprises resolution of the display device.

39. The article of manufacture defined in claim 24 wherein the one or more display device characteristics comprises limited color spectrum of the display device.

40. An apparatus comprising:
   a memory to store document images; and
   a processor coupled with the memory to
      receive a plurality of documents, where each document of the plurality of documents is represented by a document image depicting graphical features including a layout of content within the document image;
      cluster the plurality of document images into groups of document images according to discriminative visualizable features, wherein each group includes one or more document images having similar layout features for content within the one or more document images where the layout features are suitable for visualization on a type of display device, and wherein similarity of the layout features is based on analysis of a layout of discriminative visual features for content within the plurality of document images, further comprising the processor configured to:
         divide a feature space into subspaces according to visualization characteristics,
         project feature vectors onto feature subspaces of the feature space,
         cluster document images in each of the feature subspaces, and
         select one cluster split from one or more cluster splits for each of the feature subspaces;
      determine one or more display device characteristics of a specific display device of the type of display device; and
      for each group of document images:
         create a visualization to represent the group of document images based on the one or more determined display device characteristics and the discriminative visual features for content within the document images, wherein the visualization is mapped to content of the group of document images; and
         provide the visualization for display on the specific display device.

* * * * *